Dec. 10, 1963 D. W. JOHNSON 3,113,516

DATA INPUT PREPARATION

Filed Nov. 22, 1961 2 Sheets-Sheet 1

INVENTOR.
DEAN W. JOHNSON
BY Russell L. Root
ATTORNEY

Dec. 10, 1963 D. W. JOHNSON 3,113,516

DATA INPUT PREPARATION

Filed Nov. 22, 1961 2 Sheets-Sheet 2

INVENTOR.
DEAN W. JOHNSON

BY Russell L. Root

ATTORNEY

United States Patent Office 3,113,516

Patented Dec. 10, 1963

3,113,516

DATA INPUT PREPARATION

Dean W. Johnson, Willoughby, Ohio, assignor to Addressograph-Multigraph Corporation, Cleveland, Ohio, a corporation of Delaware Filed Nov. 22, 1961, Ser. No. 154,223
11 Claims. (Cl. 101—426)

This invention relates to data input and utilization in automatic data processing, and especially to forms and processes for creating an input item effectively with a high degree of accuracy even in cases where the input form is prepared on a multilocation basis as a byproduct of the preliminary transaction which generates the data.

Heretofore data input items and forms have generally been prepared by special operators who take information from prewritten forms or records and translate it into the special condition usable in the data processing system to be employed, entering it upon standard cards or forms easily handleable by the equipment. This has been found necessary in many cases because the reading or sensing devices require such as accurate formation of the data, that ordinary recording equipment adapted for multipoint local use fails to match the accuracy requirements, or because the accurate recording equipment such as the data preparation operator would use is not adapted for use by the public or large segments thereof. Moreover the writing at the point of the original transaction usually takes place under circumstances where convenience and lack of complication are of primary importance.

It is, therefore, an object of the present invention to provide an arrangement whereby printed data applied to data input forms can be formed with a high degree of outline accuracy without adding to the complexity of the usual initial imprinting procedure at the local generation point.

This has been accomplished by providing a form set of an unusual sort, presently to be described, which can still be imprinted by a local point data recorder of a kind in general use, and using a printing element such as an embossed metal plate or plastic card of the customary kind to give an impression whose sharpness and clarity meets automatic reading requirements.

It will be recalled that data recording equipment of the kind referred to in the foregoing paragraph is available for many purposes such as the imprinting of library or credit card information, and also for the entry of certain information on bank deposit slips. This equipment normally operates by using a plate or plastic card having direct reading type embossed thereon, placing the same beneath the form, and then pressing an inked ribbon or roller against the form face. While it would be clearly desirable to use such a conveniently printed form as an input element in automatic reading equipment, especially in such large volume operations as are involved with bank deposits and the like, the images so produced prior to this invention do not prove acceptable and will not read accurately when thus produced.

According to the present invention there is provided a form set consisting of two forms and at least one interleaved carbon, in which the form to be automatically read is the second form in the stack. The first form is the one which guides the writer in making any necessary entries, and between these forms is inserted a carbon coated transfer sheet having special properties. The carbon transfer sheet preferably employs a base or support element of paper, plastic film, or the like of not more than .0015 inch in thickness, one surface of which is coated with a pressure releasable carbon composition, so designed and compounded as to release substantially entirely and uniformly at the first application of writing pressure. This surface is faced towards the second form. Other conventional form sheets and carbons can be added at the bottom of the stack as desired, a principle feature of the novel form set is the provision of a vacuity somewhere in the area of the top form for permitting direct contact between the type on the printing element and the back surface of the special carbon sheet. In this way, an impression can be made on the face of the second form of the set by means of the carbon sheet, and this impression has the degree of clarity and sharpness required for automatic reading. The ink employed on the carbon paper may be ordinary black or other colored ink if the impression is to be sensed by automatic optical means, or may include standard amounts of magnetic or other special pigments if magnetic or other reading equipment is to be employed. Also, in certain instances, the top form may be omitted and the carbon sheet allowed to serve as the uppermost sheet of the stack.

The imprint will be accomplished by an embossed plate or plastic card having type of the usual degree of sharpness, the type in this case being printing (i.e. reverse-reading) type. Use will be made of guides or stops so located on the data recorder or imprinter that the desired portion of the type will be automatically brought into registry with the vacuity and thus pressed directly against the back surface of the carbon sheet which will thereby provide an impression on the second sheet of the set at the particular location desired.

The resulting imprint on this sheet will be found to have a quality and sharpness substantially equivalent to data printed directly from inked type, and when the thus imprinted form is detached and used as an input item for data processing equipment, the impression thereon will be accurately interpreted by the data processing equipment.

Other objects, features and advantages will appear therein as the description proceeds.

Figure 1:
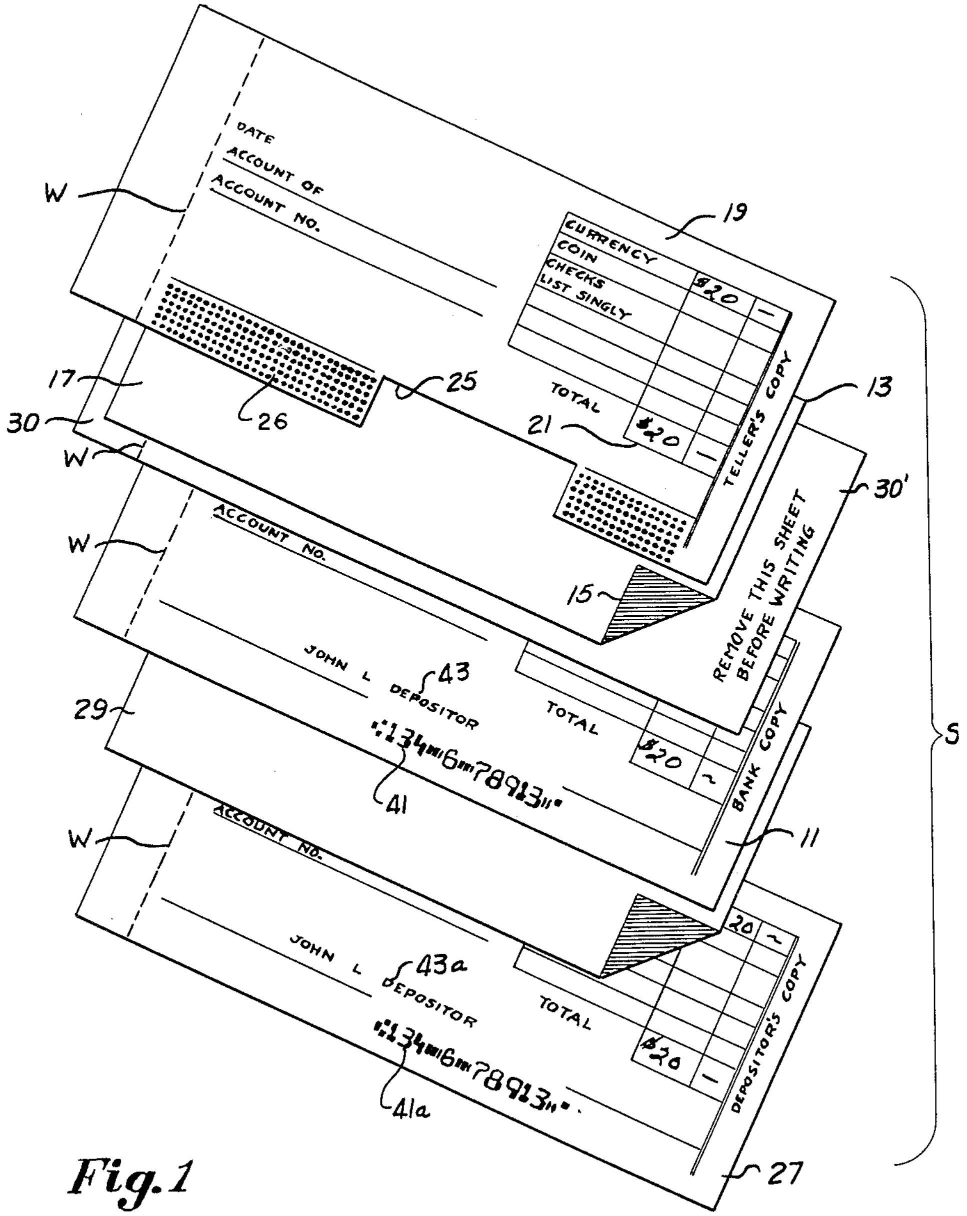
FIG. 1 is an exploded perspective of a form set of the type used in connection with the present invention and showing the same after an impression has been made.

Referring to the drawing, the present invention is concerned with marking or imprinting upon data input items such as the data input record sheet 11 which will serve as the element for carrying the information into a data processing system. In order to have sufficient body and stiffness for the purpose, specifications set up by the American Banker's Association require that the sheet 11 be of paper stock designated as 20 pounds per ream (of 500 sheets, 17 x 22 inches) or 24 pounds per ream, depending upon the direction of the grain. Paper of this weight is normally about .004 inch or more in thickness, and will be referred to herein as sheets of approved data input weight.

Overlying the data input record sheet 11 is a special transfer or carbon sheet 13 having thereon a carbon coating 15. This transfer sheet has as a base a sheet of paper or plastic film 17 which is no more than .0015 inch in thickness and preferably has a thickness of .001 inch or less. The carbon coating 15 is so compounded as to release readily and substantially totally under printing pressure of a predetermined value, but not to release to any significant degree below that or at normal handling and feeding pressures. Carbon transfer sheets whose coatings have these properties are known, and may be conveniently designated as one-time, smudge proof carbons. This carbon sheet 13 is oriented with its carbon surface towards the form 11.

Preferably the carbon coating 15 is of a magnetic type so that the impressions produced therethrough can be sensed automatically by magnetic sensing equipment. The coating 15 can be made magnetically detectable in a known manner by including in its make-up magnetic pigmentary material such as iron oxide.

The carbon sheet 13 is overlaid with a record sheet 19 intended for direct inscription by the user, e.g. to write in a money amount as in the space 21 provided thereon. This sheet can be of any desired weight but preferably is at least .002 inch in thickness in order to be readily handleable as a self-sustaining element. At one point in the sheet 19 there is provided a vacuity 25. In the form shown this is a rectangular notch die cut into one of the edges of the sheet which is perpendicular to the binding margin to be hereinafter described. While this is an arrangement which proves particularly effective from the standpoint of efficiently manufacturing the form sets from continuous strips, it will be understood that the vacuity may be produced on other edges or wholly within the outline of the form if desired. By this arrangement a portion of the carbon sheet 13 is exposed at the top of the set so that the carbon sheet may be described as forming the uppermost sheet of the set at least in a significant area thereof.

In the preferred arrangement shown portions of the top sheet 19 in line with the vacuity 25 are obliterated by general surface printing 26 for a purpose which will presently appear.

One or more additional forms 27, each together with its conventional one-time carbon sheet 29 may also be added at the bottom of the stack to provide as many copies of the record as needed.

In addition, a readily removable slip sheet 30 may also be introduced between the carbon 13 and the data input record 11, if desired, to preclude smudging or inadvertent marking during preliminary handling.

All of the sheets 19, 13, 30, 11, 29 and 27 are connected together as by adhesive at their ends in a binding margin 31 (see FIG. 2) to constitute a set S, and the carbon sheets 17 and 27 are preferably shorter than the record sheets 19, 11 and 27 to provide a snap-out feature for the set, the record sheets being provided with lines of weakening W adjacent their binding margins for this purpose. If a slip sheet 30 is used it will also be provided with a weakening line W and be dimensioned to have an extra tab 30′ which can carry a legend calling for its removal before the set is written on or imprinted.

Designed for use with set S of this invention is a printing element P which is shown in the form of a plastic card. The indicia which it is desired to imprint upon the forms, for example a depositor's account number, is formed as raised, reverse-reading type 33 by embossing the plastic card in a known manner. This is indicated by reference character 33 in FIGS. 2 and 3.

Figure 2:
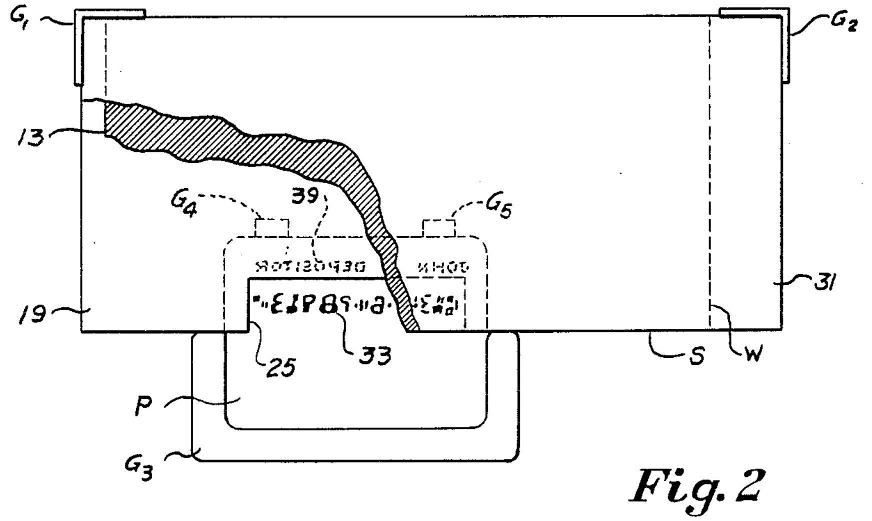
FIG. 2 is a plan showing the relationship of the form set of FIG. 1 and an imprinting element during an imprinting operation.
Figure 3:
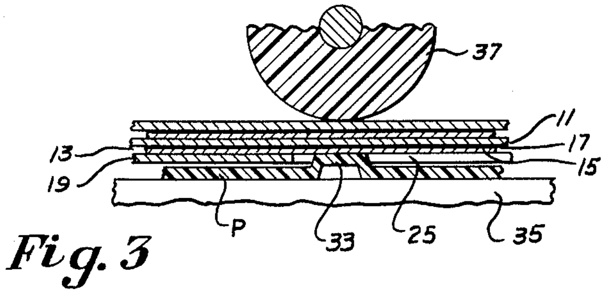
FIG. 3 is a fragmentary diagrammatic section to a large scale illustrating the use of the improved form set in the process of the present invention.

Both the form set S and the printing element P are especially suitable for cooperation with existing types of data recorders or imprinters, an exemplary form of which is shown in the patent application of Maul et al., S.N. 7,877, filed February 10, 1960, now U.S. Patent No. 3,018,725. Such an imprinter has guides (see items $G_1$ to $G_5$, FIG. 2) which determine the proper relative position for the set S and printing element P so that the type 33 will be positioned in registry with the vacuity 25 and will be impressed against the back face of the carbon sheet 13 through the vacuity 25 rather than against the record sheet 19. The positioning is shown in FIGS. 2 and 3. In FIG. 3, the bed of the data recorder is illustrated at 35 and a pressure applying roller at 37. By rolling the latter over the inverted set S with the card P correctly positioned thereunder, the desired impression will be obtained as seen at 41 in FIG. 1. Incidentally, non-critical data embossures such as that shown at 39, which need not be sensed automatically, may strike the set outside the range of the vacuity 25 if desired, and will produce an impression as shown at 43, FIG. 1. Additional conventional carbon impressions will also appear on the following forms as seen at 41a and 43a in FIG. 1. These impressions are shown for convenience in this view, although as will be readily realized, the slip sheet 30 would have to be removed before the impression on form 11 could be made.

The impression 41 produced by the foregoing procedure has unusual properties in that it has a sharp, clear outline, and when the form 11 is introduced into conventional magnetic reading equipment, the data conveyed by the impression 41 will be accurately interpreted in each instance. The change in clarity and sharpness is actually somewhat apparent to the naked eye of an observer, but for purposes of closer analysis enlarged photographs have been made of representative sample imprints showing the impression achieved when the process of this invention is employed, and also when a customary carbon impression according to previous practice is made. The latter impression was made using a single record form above the improved carbon sheet 17 described herein and of minimum practical thickness for handling, i.e. on the order of .002 inch in thickness, but without a registering vacuity. This is considered the optimum condition according to the prior practice, since to imprint through the sheet 11 using a printing member with direct reading type would place the printing operation under the even greater disadvantage of having to work through the .004 inch sheet 11. The results are shown respectively in FIGS. 4 and 5, which are detailed accurate reproductions of the enlarged photographs.

Figure 4:
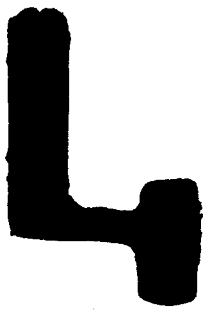
FIG. 4 is an illustration on a large scale of an imprinted character made in accordance with the present invention.
Figure 5:
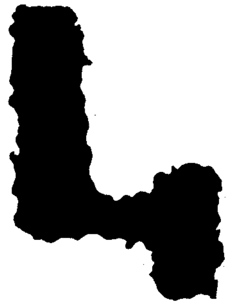
FIG. 5 is an illustration similar to FIG. 4 but showing an imprinted character resulting from customary processes of imprinting with the usual local point data recorder.

While the notable improvement of the FIG. 4 image over the best possible image achievable by prior art methods (FIG. 5) is now readily apparent, the improvement is actually much more sensible to automatic magnetic reading equipment than to ordinary vision. The differences, specifically due to the ragged outline apparently, will allow the FIG. 4 image to be read correctly virtually 100% of the time, by automatic magnetic sensing equipment, while the image in FIG. 5 is read by such equipment inaccurately in such a significant percentage of cases as to make the same of little practical use for this purpose. In this connection it will, of course, be understood that many special codes can be provided which do not have such critical limitations. However, when concurrent requirements are forced upon a code, e.g. that it must occupy a certain limited space, be visibly sensible in ordinary symbols, and in addition be automatically read, then the difficulty of distinguishing one character from another by automatic means becomes greatly magnified, and it is the problem resulting from this criticality which the present invention is designed to avoid. For convenience, codes having these properties may be referred to as critical reading codes.

The surface printing 26 on sheet 19 has the effect of discouraging the making of impressions by the writer in the obliterated areas. Thus the band along the bottom of sheet 11 which carries the impression 41 will, in the large majority of cases, remain free of false impressions in line with the travel of impression 41 during automatic reading thereof, thus contributing to the likelihood of an accurate reading of the sheet 11 as it passes through the automatic reading equipment.

From the foregoing description it is apparent that the present invention provides a new approach to the production of input elements for automatic data processing systems such that these elements may be prepared with critical reading codes by a multiplicity of individuals at various points under circumstances of minimum control, and still produce input elements of sufficiently high uniform quality to be usable effectively in an automated data handling arrangement.

While the foregoing description has proceeded primarily on the basis of input elements for automatic magnetic data processing, it will be readily understood that the principles can be applied with equal force to the formation of critical reading codes in other automatic systems, one example of which would be a system embodying automatic optical sensing of the indicia 41 on the input element 11.

While preferred embodiments of the invention have been described and illustrated, it is to be understood that these are capable of variation and modification. Accordingly, the aim in the appended claims is to cover all such variations and modifications as may fall within the true spirit and scope of the invention.

What is claimed is:

1. The method of data input preparation which comprises overlaying a data input record sheet of approved data input weight with a carbon transfer sheet having a base element of not more than .0015 inch in thickness, with its carbon face oriented towards the record sheet, overlaying the carbon sheet with a direct inscription record sheet having a vacuity therein exposing therethrough a portion of the carbon sheet overlying a portion of the data input record sheet, inscribing the surface of said direct inscription record sheet with sufficient pressure to transfer a duplicate of the inscription thus formed onto said data input record sheet, placing a printing member having reverse-reading type in contact with the direct inscription record sheet with at least a portion of the type thereon in register with said vacuity and hence in direct contact with said carbon sheet, applying transfer pressure to said printing element and said sheets, and separating the sheets to expose a data record on said data input record sheet accurately readable by automatic data processing equipment.

2. The method of data input preparation which comprises overlaying a data input record sheet of approved data input weight with a carbon transfer sheet having a base element of not more than .0015 inch in thickness and a pressure transferable carbon coating of one-time, smudge-proof type, with its carbon face oriented towards the record sheet, overlaying the carbon sheet with a direct inscription record sheet having a vacuity therein exposing therethrough a position of the carbon sheet overlying a portion of the data input record sheet, inscribing the surface of said direct inscription record sheet with sufficient pressure to transfer a duplicate of the inscription thus formed onto said data input record sheet, placing a printing member having reverse-reading type in contact with the direct inscription record sheet with at least a portion of the type thereon in register with said vacuity and hence in direct contact with said carbon sheet, applying transfer pressure to said printing element and said sheets, and separating the sheets to expose a data record on said data input record sheet accurately readable by automatic data processing equipment.

3. The method of data input preparation which comprises overlaying a data input record sheet of approved data input weight with a carbon transfer sheet having a base element of not more than .001 inch in thickness and a pressure transferable carbon coating of one-time smudge-proof type, with its carbon face oriented towards the record sheet, overlaying the carbon sheet with a direct inscription record sheet having a vacuity therein exposing therethrough a portion of the carbon sheet overlying a portion of the data input record sheet, inscribing the surface of said direct inscription record sheet with sufficient pressure to transfer a duplicate of the inscription thus formed onto said data input record sheet, placing a printing member having reverse-reading type in contact with the direct inscription record sheet with at least a portion of the type thereon in register with said vacuity and hence in direct contact with said carbon sheet, applying transfer pressure to said printing element and said sheets, and separating the sheets to expose a data record on said data input record sheet accurately readable by automatic data processing equipment.

4. The method of data input preparation which comprises overlaying a data input record sheet of approved data input weight with a carbon transfer sheet having a base element of not more than .0015 inch in thickness and a pressure transferable carbon coating containing magnetic pigment particles, with its carbon face oriented towards the record sheet, overlaying the carbon sheet with a direct inscription record sheet having a vacuity therein exposing therethrough a portion of the carbon sheet overlying a portion of the data input record sheet, inscribing the surface of said direct inscription record sheet with sufficient pressure to transfer a duplicate of the inscription thus formed onto said data input record sheet, placing a printing member having reverse-reading type in contact with the direct inscription record sheet with at least a portion of the type thereon in register with said vacuity and hence in direct contact with said carbon sheet, applying transfer pressure to said printing element and said sheets, and separating the sheets to expose a data record on said data input record sheet accurately readable by automatic magnetic data processing equipment.

5. The method of data input preparation which comprises overlaying a data input record sheet of approved data input weight with a carbon transfer sheet having a base element of not more than .001 inch in thickness and a pressure transferable carbon coating of one-time smudge-proof type containing magnetic pigment particles, with its carbon face oriented towards the record sheet, overlaying the carbon sheet with a direct inscription record sheet having a vacuity therein exposing therethrough a portion of the carbon sheet overlying a portion of the data input record sheet, inscribing the surface of said direct inscription record sheet with sufficient pressure to transfer a duplicate of the inscription thus formed onto said data input record sheet, placing a printing member having reverse-reading type in contact with the direct inscription record sheet with at least a portion of the type thereon in register with said vacuity and hence in direct contact with said carbon sheet, applying transfer pressure to said printing element and said sheets, and separating the sheets to expose a data record on said data input record sheet accurately readable by automatic magnetic data processing equipment.

6. As a new article of manufacture and sale, a form set for use in preparing data input items for automatic data processing treatment comprising a data input record sheet of approved data input weight, a carbon transfer sheet overlying said record sheet with its carbon face in contact therewith and having a base element of not more than .0015 inch in thickness, and a direct inscription sheet overlying said carbon sheet and provided with a vacuity exposing therethrough a portion of the carbon sheet overlying a portion of the data input record sheet, said sheets being bound at adjacent margins to provide a combined binding margin and form a unitary set.

7. As a new article of manufacture and sale, a form set for use in preparing data input items for automatic data processing treatment comprising a data input record sheet of approved data input weight, a carbon transfer sheet overlying said record sheet with its carbon face in contact therewith and having a base element of not more than .0015 inch in thickness and a pressure transferable carbon coating of one-time smudge-proof type, and a direct inscription sheet overlying said carbon sheet and provided with a vacuity exposing therethrough a portion of the carbon sheet overlying a portion of the data input record sheet, said sheets being bound at adjacent margins to provide a combined binding margin and form a unitary set.

8. As a new article of manufacture and sale, a form set for use in preparing data input items for automatic data processing treatment comprising a data input record sheet of approved data input weight, a carbon transfer sheet overlying said record sheet with its carbon face in contact therewith and having a base element of not more than .001 inch in thickness and a direct inscription sheet overlying said carbon sheet and provided with a vacuity exposing therethrough a portion of the carbon sheet overlying a portion of the data input record sheet, said sheets being bound at adjacent margins to provide a combined binding margin and form a unitary set.

9. As a new article of manufacture and sale, a form set for use in preparing data input items for automatic data processing treatment comprising a data input record sheet of approved data input weight, a carbon transfer sheet overlying said record sheet with its carbon face in contact therewith and having a base element of not more than .0015 inch in thickness, and a direct inscription sheet overlying said carbon sheet and provided with a notch in one margin deep enough to expose therethrough a portion of the carbon sheet overlying a portion of the data input record sheet, for reception of printing pressure directly from a printing element, said sheets being bound at adjacent margins to provide a combined binding margin and form a unitary set.

10. A form set as claimed in claim 8 in which a said notch is formed in a margin of the direct inscription sheet running transversely to the binding margin.

11. As a new article of manufacture and sale, a form set for use in preparing data input items for automatic data processing treatment comprising a data input record sheet of approved data input weight, a carbon transfer sheet overlying said record sheet with its carbon face in contact therewith and having a base element of not more than .001 inch in thickness and a pressure transferable carbon coating of one-time smudge-proof type containing magnetic pigment particles and a direct inscription sheet overlying said carbon sheet and provided with a vacuity exposing the carbon sheet therethrough, said sheets being bound at adjacent margins to provide a combined binding margin and form a unitary set, and said vacuity being in the form of a notch in a margin of the direct inscription sheet running transversely to the binding margin and deep enough to expose therethrough a portion of the carbon sheet overlying a portion of the data intput record sheet for reception of printing pressure directly from a printing element.

References Cited in the file of this patent

UNITED STATES PATENTS

| | | |
|---|---|---|
| 1,538,289 | Larter | May 19, 1925 |
| 2,256,585 | Stern | Sept. 23, 1941 |
| 2,744,031 | Mumma | May 1, 1956 |